United States Patent
Allen et al.

(10) Patent No.: US 9,164,819 B2
(45) Date of Patent: *Oct. 20, 2015

(54) COMPOSING MESSAGE PROCESSING PIPELINES

(71) Applicant: MICROSOFT CORPORATION, Redmond, WA (US)

(72) Inventors: Nicholas A. Allen, Redmond, WA (US); John A. Taylor, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/764,984

(22) Filed: Feb. 12, 2013

(65) Prior Publication Data

US 2013/0160027 A1    Jun. 20, 2013

Related U.S. Application Data

(63) Continuation of application No. 13/028,854, filed on Feb. 16, 2011, now Pat. No. 8,386,556, which is a continuation of application No. 12/203,527, filed on Sep. 3, 2008, now Pat. No. 7,895,280.

(51) Int. Cl.
   *G06F 15/16*      (2006.01)
   *G06F 15/173*     (2006.01)
   (Continued)

(52) U.S. Cl.
   CPC  *G06F 9/544* (2013.01); *G06F 8/70* (2013.01); *G06F 9/546* (2013.01); *G06F 2209/547* (2013.01)

(58) Field of Classification Search
   CPC .......... G06F 9/544; G06F 8/70; G06F 9/546; G06F 2209/547

USPC .......... 709/202, 206; 719/313, 315; 717/101, 717/102

See application file for complete search history.

(56) References Cited

U.S. PATENT DOCUMENTS 4,658,354 A    4/1987  Nukiyama
5,918,034 A    6/1999  Petolino, Jr.
(Continued)

FOREIGN PATENT DOCUMENTS

KR    10-2004-0084812 A    10/2004

OTHER PUBLICATIONS

Abbott, Mark B., et al., "Increasing Network Throughput by Integrating Protocol Layers", IEEE/ACM Transactions on Networking (TON), vol. 1, Issue 5 (Oct. 1993), 29 pages.
(Continued)

*Primary Examiner* — Haresh N Patel
(74) *Attorney, Agent, or Firm* — Henry Gabryjelski; Raghu Chinagudabha; Micky Minhas

(57) ABSTRACT

The present invention extends to methods, systems, and computer program products for composing message processing pipelines. Embodiments utilize intra-pipeline communication links to physically and/or temporally decouple pipeline stages, configure branching message flows, and bridge protocols. The use of intra-pipeline communication links permits composition of a message processing pipeline without having to alter the pipeline components or application. Each communication link is itself an application with incoming and outgoing message processing pipelines that bridge messages across time and/or space and application logic for satisfying message processing requirements.

19 Claims, 5 Drawing Sheets

(51) Int. Cl.
*G06F 9/54* (2006.01)
*G06F 9/44* (2006.01)

(56) References Cited

U.S. PATENT DOCUMENTS

| | | | |
|---|---|---|---|
| 5,966,531 A | 10/1999 | Skeen et al. | |
| 6,629,167 B1 | 9/2003 | Undy et al. | |
| 6,987,777 B1 | 1/2006 | Cain et al. | |
| 7,143,346 B2 | 11/2006 | Dunne et al. | |
| 7,181,536 B2 | 2/2007 | Burbeck et al. | |
| 7,185,060 B2 | 2/2007 | Christensen et al. | |
| 7,792,117 B1 | 9/2010 | Keller et al. | |
| 7,895,280 B2 | 2/2011 | Allen et al. | |
| 2004/0024897 A1 | 2/2004 | Ladd | |
| 2004/0193687 A1 | 9/2004 | Christensen | |
| 2004/0255046 A1 | 12/2004 | Ringseth et al. | |
| 2005/0021799 A1 | 1/2005 | Imamura et al. | |
| 2005/0076135 A1 | 4/2005 | Song et al. | |
| 2005/0183092 A1 | 8/2005 | Christensen et al. | |
| 2005/0267947 A1* | 12/2005 | Patrick et al. | 709/217 |
| 2006/0007466 A1 | 1/2006 | Ben-Yehuda et al. | |
| 2006/0034237 A1 | 2/2006 | Patrick et al. | |
| 2006/0036755 A1 | 2/2006 | Abdullah et al. | |
| 2006/0069791 A1 | 3/2006 | Patrick et al. | |
| 2006/0075045 A1* | 4/2006 | Wei et al. | 709/206 |
| 2007/0067421 A1 | 3/2007 | Angelov | |
| 2007/0073821 A1* | 3/2007 | Brail | 709/206 |
| 2007/0162540 A1 | 7/2007 | Lee et al. | |
| 2007/0198989 A1 | 8/2007 | Vernal et al. | |
| 2008/0021955 A1 | 1/2008 | Stallings | |
| 2008/0034367 A1 | 2/2008 | Patrick et al. | |
| 2008/0168166 A1 | 7/2008 | Imamura et al. | |
| 2008/0255693 A1* | 10/2008 | Chaar et al. | 700/97 |
| 2008/0255696 A1* | 10/2008 | Chaar et al. | 700/108 |
| 2008/0256390 A1* | 10/2008 | Chaar et al. | 714/27 |
| 2008/0256505 A1* | 10/2008 | Chaar et al. | 717/100 |
| 2008/0256506 A1* | 10/2008 | Chaar et al. | 717/101 |
| 2008/0256507 A1* | 10/2008 | Chaar et al. | 717/101 |
| 2008/0256516 A1* | 10/2008 | Chaar et al. | 717/121 |
| 2008/0256529 A1* | 10/2008 | Chaar et al. | 717/174 |
| 2008/0319730 A1* | 12/2008 | Clark et al. | 703/19 |
| 2009/0006629 A1* | 1/2009 | Gudenkauf et al. | 709/227 |
| 2009/0043622 A1* | 2/2009 | Finlayson et al. | 705/7 |
| 2009/0043631 A1* | 2/2009 | Finlayson et al. | 705/9 |
| 2009/0055795 A1* | 2/2009 | Finlayson et al. | 717/101 |
| 2009/0064322 A1* | 3/2009 | Finlayson et al. | 726/21 |
| 2009/0282222 A1* | 11/2009 | Hoover et al. | 712/220 |
| 2009/0300577 A1* | 12/2009 | Bernardini et al. | 717/101 |
| 2009/0300586 A1* | 12/2009 | Bernardini et al. | 717/126 |
| 2010/0017252 A1* | 1/2010 | Chaar et al. | 705/9 |
| 2010/0017782 A1* | 1/2010 | Chaar et al. | 717/101 |
| 2010/0023918 A1* | 1/2010 | Bernardini et al. | 717/101 |
| 2010/0023919 A1* | 1/2010 | Chaar et al. | 717/101 |
| 2010/0023920 A1* | 1/2010 | Chaar et al. | 717/102 |
| 2010/0023921 A1* | 1/2010 | Chaar et al. | 717/102 |
| 2010/0031090 A1* | 2/2010 | Bernardini et al. | 714/38 |
| 2010/0031226 A1* | 2/2010 | Chaar et al. | 717/101 |
| 2010/0031234 A1* | 2/2010 | Chaar et al. | 717/113 |
| 2011/0138399 A1 | 6/2011 | Allen et al. | |

OTHER PUBLICATIONS

SYNC4J, "Sync4j Sync Server Developer's Guide", Jan. 2005, Copyright 2005-2006 Funambol, 54 pages.
Benini, Luca, et al., "The Challenges of Next-Gen Multicore Networks-On-Chip Sysgtems: Part 6", Mar. 2007, 8 pages.
Williams, Mickey, "Using Open XML Schema with .net" Aug. 2004, 5 pages.
Sanket B. "Pipelines in BizTalk 2006", (8 pages) Internet citation, Jun. 13, 2006. http://blogs.msdn.com/b/sanket/archive/2006/06/13/pipelines-in-biztalk-2006.aspx.
U.S. Appl. No. 12/203,527, Nov. 12, 2010, Notice of Allowance.
U.S. Appl. No. 12/203,527, Dec. 29, 2010, Supplemental Notice of Allowability.
U.S. Appl. No. 13/028,854, Oct. 18, 2012, Notice of Allowance.
"Office Action Received for European Patent Application No. 09811923.3", Mailed Date: May 8, 2014, Filed Date: Aug. 11, 2009, 5 Pages.

* cited by examiner

COMPOSING MESSAGE PROCESSING PIPELINES

CROSS-REFERENCE TO RELATED APPLICATIONS

This application is a continuation of U.S. patent application Ser. No. 13/028,854, filed on Feb. 16, 2011, entitled "COMPOSING MESSAGE PROCESSING PIPELINES," which issued as U.S. Pat. No. 8,386,556 on Feb. 26, 2013, and which is a continuation of U.S. patent application Ser. No. 12/203,527, filed Sep. 3, 2008, entitled "COMPOSING MESSAGE PROCESSING PIPELINES," which issued as U.S. Pat. No. 7,895,280 on Feb. 22, 2011, the entirety of each of which are incorporated herein by reference.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In a distributed computing environment it is often desirable to decouple the protocol implementations that connect services from the application processing logic. An established pattern for this combination is to implement a layered protocol stack where each layer builds on the features of the underlying protocol. For example, the base layer might provide raw data connectivity while higher layers add security or delivery guarantees. By use of message abstractions, the protocol layers may also have some degree of compositional independence. For example, the security protocol may be usable with many different transport protocols.

A layered protocol stack is often abstracted as a message processing pipeline. The application logic is then written in a protocol independent fashion and later combined with one or more of the pipelines. However, the current realizations of a message processing pipeline for several technologies share a number of different limitations. For example, components in a message processing pipeline typically compose in a temporally and physically coupled fashion.

Temporal coupling in a protocol stack constrains the behavior of the application, for example, causing an application to wait for a message processing pipeline to complete operations before moving forward. One example of temporal coupling is when a protocol requires acknowledgement for a message before the next protocol can execute. A second example is when a protocol batches several messages into a single message for the next protocol to transmit. These examples require synchronization between protocols and may require that the application participate in that synchronization to implement certain message-exchange patterns.

Physical coupling occurs when a protocol stack has a dependency on its execution environment. For example, a protocol may depend on having a particular software library installed on the local machine. Several protocols may each have such dependencies. The protocol stack can only be deployed to an execution environment that simultaneously satisfies all of the dependencies. A company may have to purchase additional software or hardware to construct such an execution environment because each deployed pipeline has different dependency requirements.

BRIEF SUMMARY

The present invention extends to methods, systems, and computer program products for composing message processing pipelines. A computer system accesses a current pipeline specification for the application. The current pipeline specification specifies how to construct a message processing pipeline for the application, including specifying messaging components that are to be included in the message processing pipeline for the application. The computer system accesses additional message processing requirements for the application. Additional message processing requirements can be expressly included, for example, in a configuration file, user instructions, or a second pipeline specification. Additional message processing requirements can be also be inferred from the contents of the current specification relative to contents of, for example, a configuration file, user instructions, or a second pipeline specification.

The computer system identifies transforms that can be applied to the current pipeline specification to specify additional message processing functionality that satisfies the additional message processing requirements. The transforms are identified based on the messaging components already specified for inclusion in the message processing pipeline and based on the additional message processing requirements. The transforms can also be identified based on what messaging components are available to the computer systems.

The computer system applies the identified transforms to the current pipeline specification to create a transformed pipeline specification for the application. The transformed pipeline specification specifies how to construct a message processing pipeline for the application that satisfies the additional message processing requirements. The transformed pipeline specification specifies an arrangement of messaging components that are to be included in the message processing pipeline to satisfy the additional message processing requirements. The computer system interprets the transformed pipeline specification to instantiate a message processing pipeline for the application. The instantiated message processing pipeline configured to satisfy the additional message processing requirements for the application.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
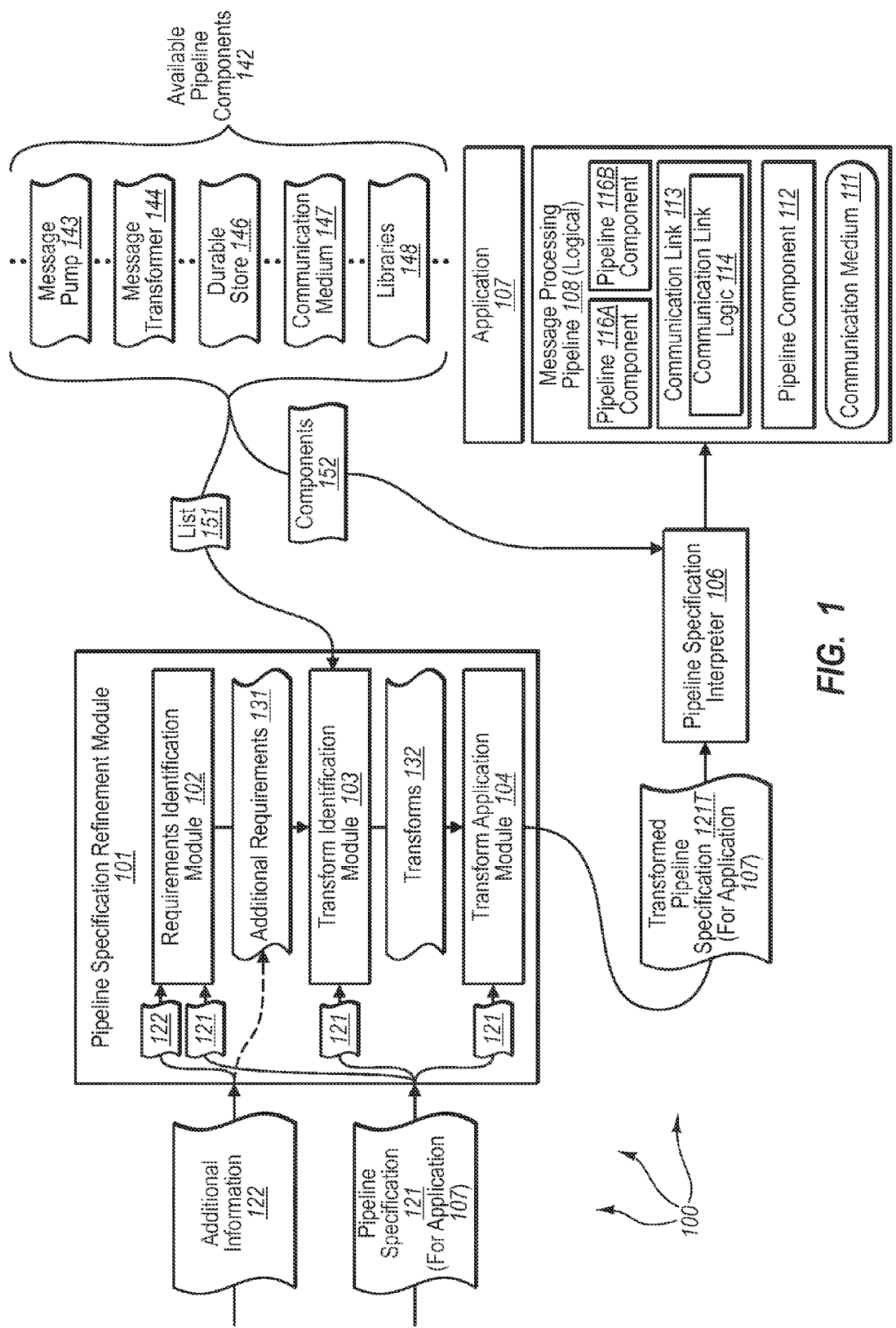
FIG. 1 illustrates an example computer architecture that facilitates composing message processing pipelines.

The present invention extends to methods, systems, and computer program products for composing message processing pipelines. A computer system accesses a current pipeline specification for the application. The current pipeline specification specifies how to construct a message processing pipeline for the application, including specifying messaging components that are to be included in the message processing pipeline for the application. The computer system accesses additional message processing requirements for the application. Additional message processing requirements can be expressly included, for example, in a configuration file, user instructions, or a second pipeline specification. Additional message processing requirements can be also be inferred from the contents of the current specification relative to contents of, for example, a configuration file, user instructions, or a second pipeline specification.

The computer system identifies transforms that can be applied to the current pipeline specification to specify additional message processing functionality that satisfies the additional message processing requirements. The transforms are identified based on the messaging components already specified for inclusion in the message processing pipeline and based on the additional message processing requirements. The transforms can also be identified based on what messaging components are available to the computer systems.

The computer system applies the identified transforms to the current pipeline specification to create a transformed pipeline specification for the application. The transformed pipeline specification specifies how to construct a message processing pipeline for the application that satisfies the additional message processing requirements. The transformed pipeline specification specifies an arrangement of messaging components that are to be included in the message processing pipeline to satisfy the additional message processing requirements. The computer system interprets the transformed pipeline specification to instantiate a message processing pipeline for the application. The instantiated message processing pipeline is configured to satisfy the additional message processing requirements for the application.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates composing message processing pipelines. Referring to FIG. 1, computer architecture 100 includes pipeline specification refinement module 101, pipeline specification interpreter 106, and application 107. Each of the depicted computer systems is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, pipeline specification refinement module 101 is configured to transform a pipeline specification, in view of additional message processing requirements, into a pipeline specification that specifies a message processing pipeline that satisfies the additional message processing requirements. Pipeline specification refinement module 101 includes requirements identification module 102, transform identification module 103, and transform application module 104.

Requirements identification module 102 is configured to identify additional processing requirements for a message processing pipeline. Additional requirements can be expressly included in additional information, such as, for example, in a configuration file, user instructions, or a second pipeline specification, provided to pipeline specification refinement module 101. For example, a configuration file can indicate that encryption or reliability between different layers in a protocol stack is required. Requirements identification module 102 can access additional information and identify additional processing requirements included in the additional information.

Requirements identification module 102 can also infer additional processing requirements based on the contents of a pipeline specification in view of the contents of additional information. Thus, requirements identification module 102 can infer additional message processing requirements based on the contents of pipeline specification in view of, for example, a configuration file, user instructions, or a second pipeline specification. For example, it may be that one pipeline specification specifies a first transport layer protocol and another pipeline specification specifies a second different transport protocol. Accordingly, requirements identification module 102 can infer that the use of a protocol bridge between the first and second transport protocols is an additional message processing requirement.

Transform identification module 103 is configured to identify transforms that can be applied to a pipeline specification to transform the pipeline specification to specify a message processing pipeline that satisfies additional message processing requirements. For example, based on a current pipeline specification and additional requirements, transform identification module 103 can identify transforms to transform the current pipeline specification into a transformed pipeline specification. The transformed pipeline specification can specify, for example, an intra-pipeline communication link having an arrangement of message processing components that satisfy the additional message processing requirements.

When identifying transforms, transform identification module 103 can also consider the functionality of available pipeline components, such as, for example, message pumps, message transformers, durable stores, communication mediums, libraries, etc., that are available for inclusion in a message processing pipeline. Available pipeline components can be collocated with pipeline specification refinement model 101 and/or can be located remotely relative to pipeline specification refinement module 101. Thus, available components specified for inclusion in a message processing pipeline can be accessed locally and/or remotely.

Depending on available pipeline components, transform identification module 103 can identify different transforms to apply to a specification. However, since different combinations of pipeline components may be able to achieve the same results, different transforms to a pipeline specification can still define a message processing pipeline that satisfies additional message processing requirements. That is, depending on the functionality of available pipeline components, different combinations of pipeline components can be specified to satisfy additional message processing requirements.

Transform application module 104 is configured to apply identified transforms to a pipeline specification to transform the specification into a transformed specification that satisfies additional message processing requirements. For example, transform application module 104 can receive a pipeline specification and transforms and apply the transforms to the pipeline specification to create a transformed pipeline specification. The resulting transformed specification can comply with syntax and semantic constraints of a pipeline specification interpreter. For example, if a pipeline specification is configured for input to a pipeline specification interpreter, a transformed pipeline specification based on the pipeline specification can also be configured for input to the same pipeline specification interpreter. However, it is also possible for transformations to alter the configuration of a pipeline specification for input to a different pipeline specification interpreter. Transforming a pipeline specification can include altering the contents of a pipeline specification, such as, for example, making textual edits or other changes, to specify message processing pipeline functionality and/or components.

Pipeline specification interpreter 106 is configured to interpret a pipeline specification and instantiate a message processing pipeline from the pipeline specification. For example, pipeline specification interpreter 106 can receive an appropriately configured pipeline specification. In response to receiving a pipeline specification, pipeline specification interpreter 106 can identify message processing components for instantiating a message processing pipeline specified in the pipeline specification. Pipeline specification interpreter 106 can then instantiate a message processing pipeline, for example, including an intra-pipeline communication link with identified message processing components arranged in a manner to provide desired message processing functionality, including satisfying any additional requirements.

Different portions of a message processing pipeline can be instantiated at different machines or in different processes at the same machine. Intra-pipeline communication links can be used to connect portions of a message processing pipeline at one machine (or process) to portions of a message processing pipeline at another machine (or process). Message flow through a message processing pipeline can also branch between different pipeline components, such as, for example, based on message properties, protocol properties, machine properties, etc. Intra-pipeline communication links can abstract durable stores, such as, for example, durable message queuing products, to provide durable communication links. Durable communication links permit pipeline components to continue processing message when they would otherwise have to wait for a response from other pipeline components to continue. Message processing pipelines can also include pipeline components that facilitate protocol bridging and other transformation services between pipeline components.

As depicted in computer architecture 100, application 107 is separate from message processing pipeline 108. However, embodiments of the invention also include message processing pipelines that include applications as pipeline components within the message processing pipeline.

Figure 2:
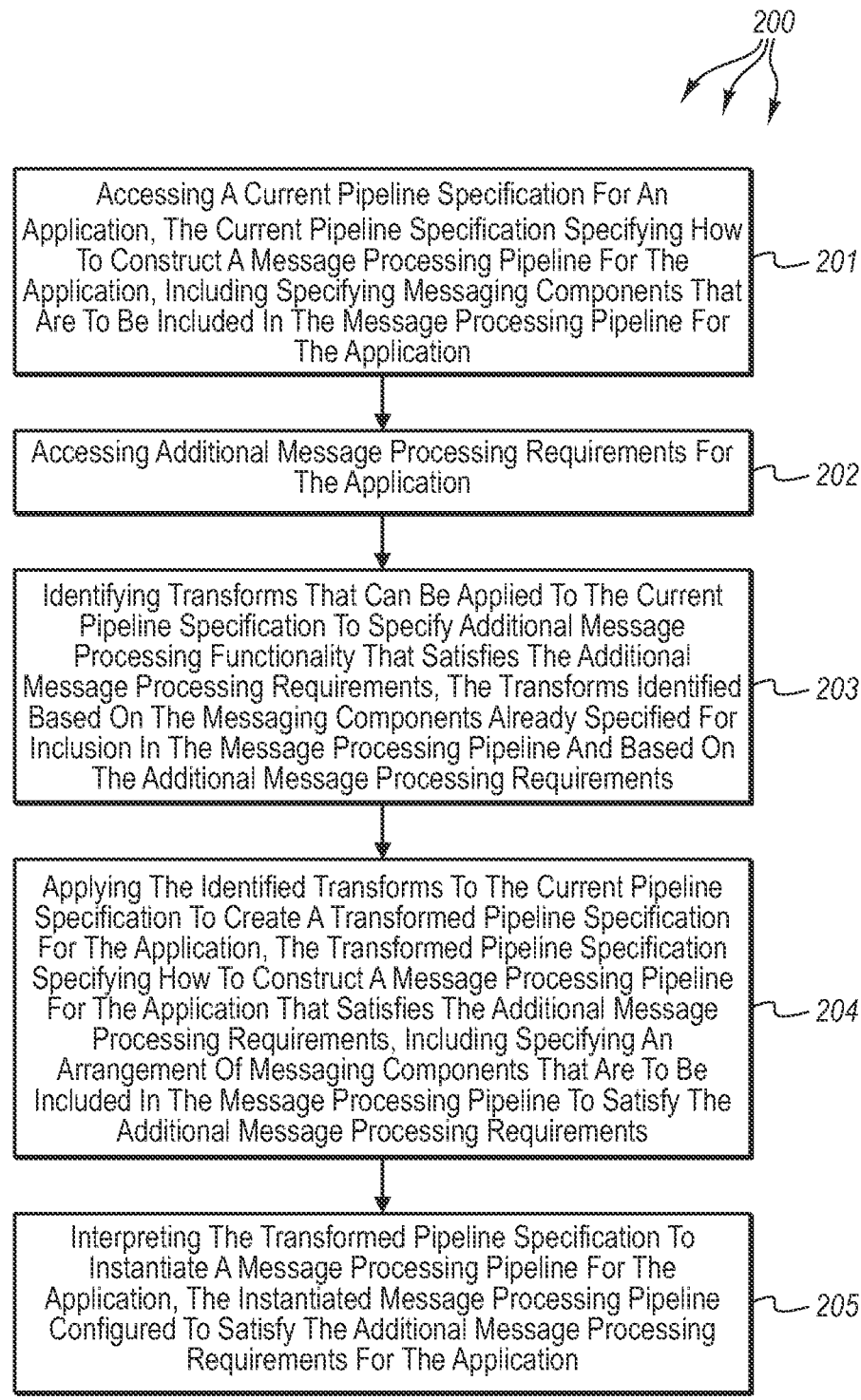
FIG. 2 illustrates a flow chart of an example method for composing a message processing pipeline.

FIG. 2 illustrates a flow chart of an example method 200 for composing a message processing pipeline. The method 200 will be described with respect to the components and data of computer architecture 100.

Method 200 includes an act of accessing a current pipeline specification for an application, the current pipeline specification specifying how to construct a message processing pipeline for the application, including specifying messaging components that are to be included in the message processing pipeline for the application (act 201). For example, pipeline specification refinement module can access pipeline specification 121. Pipeline specification 121 can specify how to construct a message processing pipeline for application 107. Pipeline specification 121 can specify pipeline components, from available pipeline components 142, which are to be included in a message processing pipeline for application 107.

Available pipeline components 142 can include pipeline components located locally and/or remotely (e.g., at other machines accessed via network communication) to pipeline specification module 101. Available pipeline components 142 can be configured to implement a variety of different functions, such as, for example, message pumps (e.g., 143), message transformers (e.g., 144), abstraction of durable stores (e.g., 146) to provide durable communication links, communication mediums (e.g., 147), and libraries (e.g., 148). Pipeline components in available pipeline components 142 can be stitched together within a message processing pipeline, for example, in an intra-pipeline communication link, to provide message processing functionality (e.g., encryption, signing, reliability, protocol bridging, message conversion, pipeline branching, etc.) specified in a pipeline specification.

Requirements identification module 102 can identify additional requirements for pipeline specification 121. For example, requirements identification module 102 can identify additional requirements 131 based on the contents of additional information 122 and/or pipeline specification 121. In some embodiments, the contents of additional information 122 expressly indicate additional requirements. For example, additional information 122 can represent the contents of another pipeline specification (e.g., for an application that is to communicate with application 107), a configuration file, user commands, etc., that expressly indicates additional requirements 131. Requirements identification module 102 can identify the expressly indicated additional requirements from additional information 122.

Alternately or in combination with identifying expressly indicated additional requirements, requirements identification module 102 can also infer additional requirements. For example, requirements identification module 102 can access additional information 122 and pipeline specification 121. From the contents of additional information 122 and pipeline specification 121, requirements identification module 102 can infer additional requirements 131.

Requirements identification module 102 can compare the contents of additional information 122 to the content of pipeline specification 121 and make inferences based on the comparison. For example, additional information 122 may indicates that another application uses a specified messaging function (e.g., encryption, reliable messaging, etc.) when communicating (without expressly indicating that inclusion of the specified message function is a requirement). On the other hand, pipeline specification 121 may not specify the specified message function for inclusion in a message processing pipeline application 107.

From a comparison between additional information 122 and pipeline specification 121, requirements identification module 102 can determine that the other application uses the specified messaging function but that pipeline specification 121 does not specify the specified messaging function. Thus, requirements identification module 102 can infer that a message processing pipeline for application 107 is to include the specified messaging function to communicate with the other application. Accordingly, requirements identification module 102 can identify an additional requirement that pipeline specification 121 specify the specified messaging function.

Requirements identification module 102 can send additional requirements 131 to transform identification module 103. Accordingly, method 200 includes an act of accessing additional message processing requirements for the application (act 202). For example, transform identification module 103 can receive additional requirements 131.

Method 200 includes an act of identifying transforms that can be applied to the current pipeline specification to specify additional message processing functionality that satisfies the additional message processing requirements, the transforms identified based on the messaging components already specified for inclusion in the message processing pipeline and based on the additional message processing requirements (act 203). For example, transform identification module 103 can identify transforms 132. Transforms 132 can be applied to pipeline specification 121 to specify additional message processing functionality, such as, for example, an intra-pipeline communication link that satisfies additional requirements 131. Transforms 132 can be identified based on pipeline components already specified in pipeline specification 121 and additional requirements 131.

Transforms 132 can also be based on components included in available pipeline components 142. For example, list 151 can identify the components included in available pipeline components 142 as well as their functionality. From list 151, transform identification module 103 can identify what transforms 132 to apply to specification 121. The identified transforms 132 can be used to transform portions of pipeline specification 121 to specify components (from available pipeline components 142) for implementing message processing functionality that satisfies additional requirements 131.

Depending on what pipeline components are already specified in specification 121, different transforms can be identified to specify message processing functionality for satisfying additional requirements 131. Transform identification module 103 can send transforms 132 to transform application module 104. Transform application module 104 can receive transforms 132 from transform identification module 103.

Method 200 includes an act of applying the identified transforms to the current pipeline specification to create a transformed pipeline specification for the application, the transformed pipeline specification specifying how to construct a message processing pipeline for the application that satisfies the additional message processing requirements, including specifying an arrangement of messaging components that are to be included in the message processing pipeline to satisfy the additional message processing requirements (act 204). For example, transform application module 104 can apply transforms 132 to pipeline specification 121 to create transformed pipeline specification 121T. Transformed pipeline specification 121T specifies how to construct a message processing pipeline that satisfies additional requirements 131. Transformed pipeline specification 121T can specify an arrangement of pipeline components (e.g., from available pipeline components 142), that are to be included in a message processing pipeline, such as, for example, included in communication link 113, to satisfy the additional requirements 131.

Method 200 includes an act of interpreting the transformed pipeline specification to instantiate a message processing pipeline for the application, the instantiated message processing pipeline configured to satisfy the additional message processing requirements for the application (act 205). For example, pipeline specification interpreter 106 can interpret transformed pipeline specification 121T to instantiate message processing pipeline 108. Pipeline specification interpreter 106 can access components 152 to instantiate message processing pipeline 108. Pipeline specification interpreter 106 can arrange components 152 as specified in transformed pipeline specification 121T. Accordingly, specification interpreter 106 can instantiate message processing pipeline 108 in a manner such that communication link 113 satisfies additional requirements 131.

Message processing pipeline 108 includes communication medium 111, pipeline component 112, communication link 113 with communication link logic 114, and pipeline components 116A and 116B. As depicted in FIG. 1, message processing pipeline 108 is represented logically. Different components in the message processing pipeline can be physical located at different machines. For example, pipeline component 112, pipeline component 116A, pipeline component 116B, and application 107 can all potentially be physically located at different machines. Pipeline components 116A and 116B represent that message processing in message processing pipeline 108 can branch based on message properties, protocol properties, machine properties, etc.

Communication link 113 can receive messages from pipeline component 112. Communication link logic 114 can determine a disposition of messages received from pipeline component 112 in a manner that satisfies additional requirements 131. Communication link 113 can send messages to pipeline components 116A and/or 116B.

Generally, an intra-pipeline communication link can use any underlying communication media. Use of communication media can be based on the location of the pipeline components preceding and succeeding the intra-pipeline communication link. For example, if pipeline components are deployed in different processes on the same machine, a system bus can be used as the communication medium. On the other hand, if pipeline components are deployed at different machines, a network medium (wired and/or wireless) can be used as the communication medium.

Thus, more specifically, intra-pipeline communication links can include an incoming communication medium connecting a pipeline component to the preceding pipeline component. Intra-pipeline communication links can also include a receiving message processing pipeline for processing messages from the incoming communication medium. Intra-pipeline communication links can also include a communication link application that processes messages and determines their disposition. Intra-pipeline communication links can also include one or more outgoing communication media connecting a pipeline component to the succeeding pipeline component. Intra-pipeline communication links can also include one or more sending message processing pipelines for transmitting messages to corresponding outgoing communication mediums.

Figure 3:
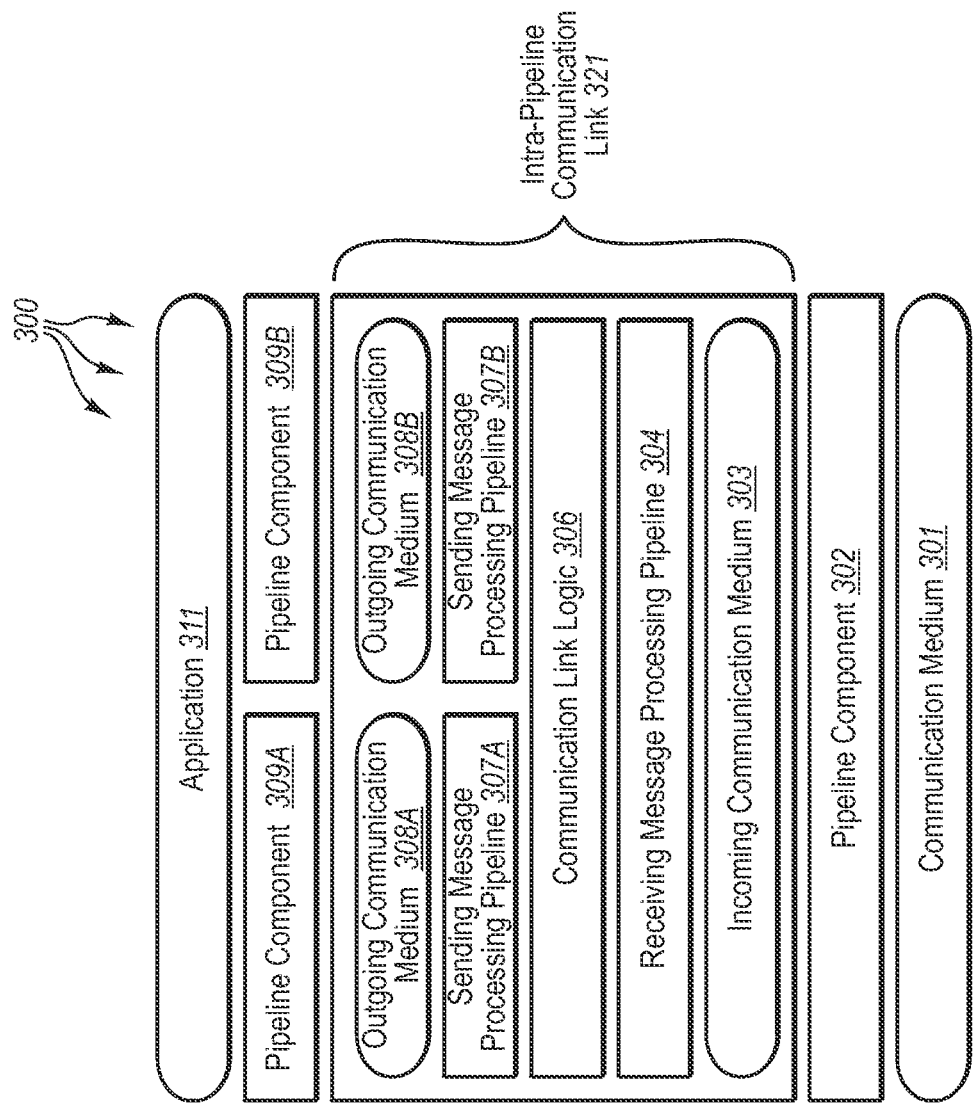
FIG. 3 illustrates an example message processing pipeline.

FIG. 3 illustrates an example message processing pipeline 300 including intra-pipeline communications link 321. Message processing pipeline 300 includes communication medium 301, pipeline component 302, intra-pipeline communication link 321, pipeline components 309A and 309B, and application 311. As depicted, intra-pipeline communication link 321 connects pipeline component 302 to pipeline components 309A and 309B.

Intra-pipeline communication link 321 includes incoming communication medium 303, receiving message processing pipeline 304, communication link logic 306, sending message processing pipelines 307A and 307B, and outgoing communication mediums 308A and 308B. Incoming communication medium 303 connects intra-pipeline communication link 321 to pipeline component 302. Receiving message processing pipeline 304 receives messages from pipeline component 302 via incoming communication medium 303.

Communication link logic 306 processes messages to determine how to dispose of the messages. For example, based on the contents of or protocol associated with a message, communication link logic 306 can determine if the message is to be sent to message processing pipeline 307A or sent to message processing pipeline 307B.

Outgoing communication mediums 308A and 308B connect intra-pipeline communication link 321 to pipelines components 309A and 309B respectively. Sending message processing pipelines 307A and 307B transmit messages to outgoing communication mediums 308A and 308B respectively.

Thus, the use of communication links within a message processing pipeline permits the flow of execution to branch among multiple pipeline components. As such, several different instances of a pipeline component may exist that can each process a different type of message. A communication link can branch to a particular instance of the pipeline component depending on the type of message received. The pipeline can then later be rejoined before messages reach the application so that the application is unaware that the branching took place. Alternatively, the application logic may similarly be split according to the type of message and so it may be desirable that the branched pipelines continue all the way up to the application.

For example, both pipeline component 309A and pipeline component 309B send messages to application 311. However, branches of intra-pipeline communication link 300 need not consolidate into the same application. For example, pipeline component 309A can send messages to application 311 and pipeline component 309B can send messages to some different application.

Embodiments of the invention include deploying pipeline components on different machines, possibly depending on the resources available on that particular machine. Intra-pipeline communication links can be used to bridge the connections between machines so that each pipeline component can be deployed to a separate appropriately configured machine.

Figure 4:
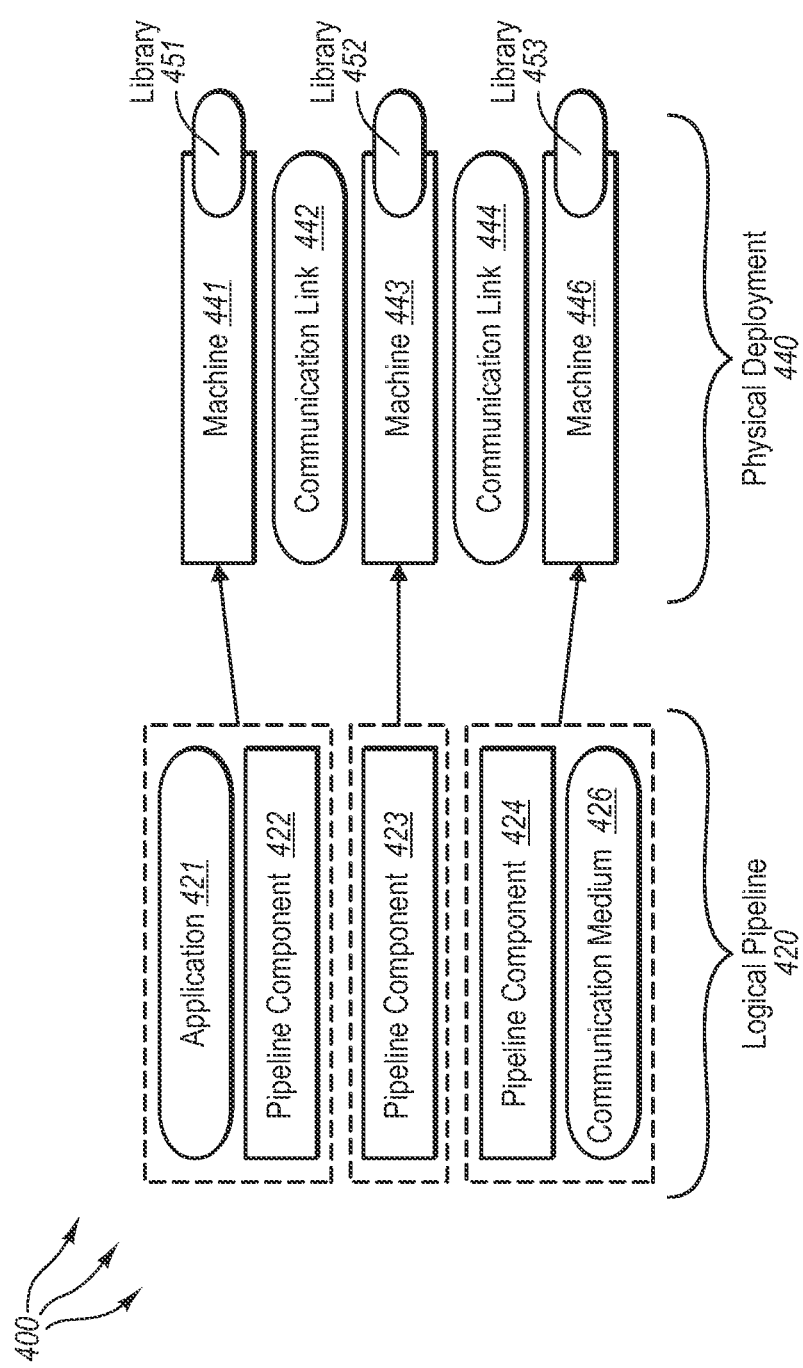
FIG. 4 illustrates a computer architecture that includes a logical pipeline and its corresponding physical deployment.

As previously described, an intra-pipeline communication link can use network media to communicate between pipeline components when pipeline components are deployed at different machines. Turning to FIG. 4, FIG. 4 illustrates a computer architecture 400 that includes logical pipeline 420 and its corresponding physical deployment 440. As depicted, logical pipeline 420 includes communication medium 426, pipeline component 424, pipeline component 423, pipeline component 422, and application 421. Communication medium 426 and pipeline component 424 are deployed on machine 446. One or more of communication medium 426 and pipeline component 424 can utilize (and may even require) library 453.

Pipeline component 423 is deployed on machine 443. Pipeline component 423 can utilize (and may even require) library 452. Pipeline component 422 and application 421 are deployed on machine 441. Pipeline component 422 and application 421 can utilize (and may even require) library 451.

Intra-pipeline communication links can be used to connect pipeline components deployed at one machine to pipeline components deployed at another machine. For example, communication link 444 connects pipeline component 424 to pipeline component 423 and vice versa. Similarly, communication link 442 connects pipeline component 423 to pipeline component 422 and vice versa.

However, separation of pipeline components using a machine isolation boundary is not the only possible granularity. Other kinds of isolation boundaries, such as, for example, deployment into separate processes on the same machine can also be used.

Figure 5:
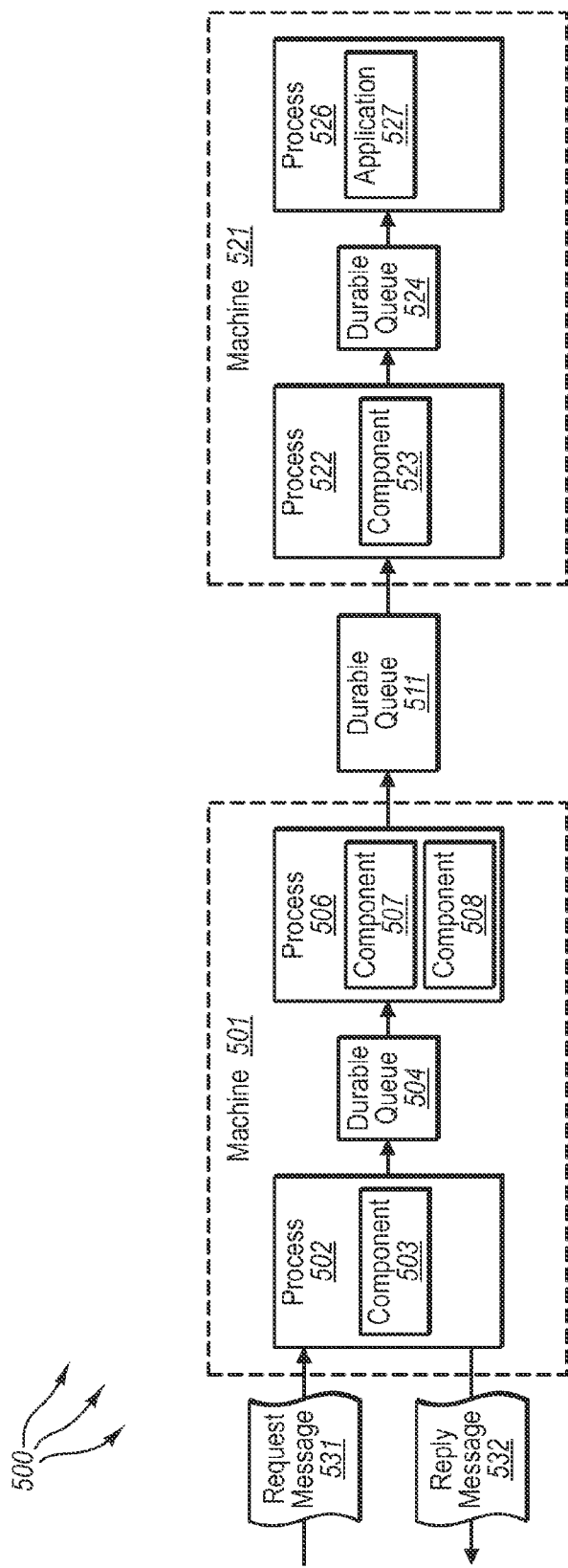
FIG. 5 illustrates a computer architecture with message processing pipeline components separated by durable queues.

In other embodiments, physical deployment of pipeline components can be separated by durable message queues. Placing durable stores between the pipeline components allows them to execute in a temporally independent fashion. FIG. 5 illustrates computer architecture 500 with message processing pipeline components separated by durable queues.

As depicted in FIG. 5, request messages, such as, for example, request message 531 enters at process 502. Likewise, reply messages, such as, for example, replay message 532 leave at process 502. Machine 501 includes processes 502 and 503. Process 502 includes component 503 and process 506 includes components 507 and 508. Durable queue 504, via local communication media at machine 501, separates component 503 from components 507 and 508. Machine 521 includes processes 522 and 526. Process 522 includes component 523 and process 526 includes application 527 (e.g., another pipeline component). Durable queue 524, via local communication media at machine 521, separates component 523 from application 527. Durable queue 511, via network communication media between machines 501 and 502, separates components 507 and 508 from component 523.

Within computer architecture 500, if components 507 or 508 are to respond to the originator of request message 531 using an out of band mechanism (e.g., an outbound message acknowledgment) they are free to do so independently of the transfer acknowledgement that was sent by component 503 and independently of the later pipeline execution and the application. Pipeline component 503 can also send a response to request message 531 as soon request message 531 is placed in durable queue 504. Pipeline component 507 may suffer a temporary failure due to being unable to send an acknowledgment but this does not prevent pipeline component 503 from continuing to process more requests. Similarly, durable queue 511 allows the later pipeline components and application 527 to continue processing requests that have already been acknowledged.

Thus, specification of a communication link can be thought of as part of the overall specification for the pipeline. Each communication link may be specified inline within a single pipeline specification or linked together using references to other specifications. In some cases it is possible to automatically infer the specification of a communication link. For example, if two adjacent pipeline components are configured such that the first pipeline component emits messages using a first message format and the second pipeline component consumes messages using a second message format, then the existence of a communication link that translates between the first and second message formats may inferred by the system rather than requiring an express specification.

Accordingly, embodiments of the invention facilitate composable message processing pipelines. Embodiments utilize intra-pipeline communication links to decouple the pipeline stages. The use of intra-pipeline communication links permits composition of a message processing pipeline without having to alter the pipeline components or application. Each communication link is itself an application with incoming and outgoing message processing pipelines that bridge messages across time and/or space, for example, depending on whether the pipeline components that are being linked have temporal or physical couplings that the application developer wishes to eliminate.

For example, the application developer may eliminate a physical coupling by having the communication link transmit messages to a different machine where the next pipeline component is located. The application developer may eliminate a temporal coupling by having the communication link read and write messages to a durable store so that the next pipeline component can execute at a later time. Accordingly, the communication link applications, communication link pipelines, and corresponding connections for inserting communication links into a message processing pipeline can be constructed from a pipeline specification without requiring an application developer to individually program the communication links.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system including one or more hardware processors and system memory, a method for processing pipeline specifications, the method comprising:

an act of the computer system accessing a first pipeline specification for the application that specifies at least a first pipeline component to be included in a message processing pipeline which is dependent on a first code library at a first computer system, the first pipeline specification specifying how to construct the message processing pipeline for the application;

an act of the computer system accessing a second pipeline specification for the application that specifies at least a second pipeline component to be included in the message processing pipeline which is dependent on a second code library at a second computer system;

an act of the computer system accessing additional message processing requirements for the application;

an act of the computer system identifying transforms that can be applied to the first pipeline specification to specify additional message processing functionality that satisfies the additional message processing requirements;

an act of the computer system applying the identified transforms to the first pipeline specification to create a transformed pipeline specification for the application, the transformed pipeline specification specifying how to construct a message processing pipeline for the application that satisfies the additional message processing requirements, by specifying at least one intra-pipeline communication link having an arrangement of message processing components that satisfy the additional message processing requirements;

an act of determining that the first library is available at the first computer system; and an act of determining that the second library is available at the second computer system that is different than the first computer system.

2. The method of claim 1, wherein the transformed pipeline specification is subsequently used to instantiate a message processing pipeline for the application.

3. The method as recited in claim 2, further comprising:

an act of identifying components that are available to the computer system for inclusion in the message processing pipeline; and wherein the act of identifying transforms that can be applied to the first pipeline specification comprises an act of identifying transforms that can be applied to the message processing pipeline based on the identified available components.

4. The method of claim 1 wherein the method further includes:

an act of transforming the first specification to include an intra-pipeline communication link for connecting the first pipeline component to the second pipeline component, the intra-pipeline communication link including an incoming communication medium to receive messages from the first pipeline component, an outgoing communication medium to send messages to the second pipeline component, a message pump to pump messages from the incoming communication medium to the outgoing communication medium.

5. The method of claim 4, wherein the method further includes:

an act instantiating the message processing pipeline for the application that deploys the first pipeline component at the first computer system, deploys the second pipeline component at the second computer system, and utilizes intra-pipeline communication link to transfer messages from the first pipeline component to the second pipeline component.

6. A computer storage device having stored computer-executable instructions which, when executed by one or more processors, implement a method for processing pipeline specifications, wherein the method comprises:

an act of the computer system accessing a first pipeline specification for the application that specifies at least a first pipeline component to be included in a message processing pipeline which is dependent on a first code library at a first computer system, the first pipeline specification specifying how to construct the message processing pipeline for the application;

an act of the computer system accessing a second pipeline specification for the application that specifies at least a second pipeline component to be included in the message processing pipeline which is dependent on a second code library at a second computer system;

an act of accessing additional message processing requirements for the application;

an act of identifying transforms that can be applied to the first pipeline specification to specify additional message processing functionality that satisfies the additional message processing requirements;

an act of applying the identified transforms to the first pipeline specification to create a transformed pipeline specification for the application, the transformed pipeline specification specifying how to construct a message processing pipeline for the application that satisfies the additional message processing requirements, by specifying at least one intra-pipeline communication link having an arrangement of message processing components that satisfy the additional message processing requirements;

an act of determining that the first library is available at the first computer system; and an act of determining that the second library is available at the second computer system that is different than the first computer system.

7. The computer storage device of claim 6, wherein the transformed pipeline specification is subsequently used to instantiate a message processing pipeline for the application.

8. The computer storage device as recited in claim 6, wherein the method further comprises:

an act of identifying components that are available to the computer system for inclusion in the message processing pipeline; and wherein the act of identifying transforms that can be applied to the first pipeline specification comprises an act of identifying transforms that can be applied to the message processing pipeline based on the identified available components.

9. The computer storage device of claim 6, wherein the method further includes:

an act of transforming the first specification to include an intra-pipeline communication link for connecting the first pipeline component to the second pipeline component, the intra-pipeline communication link including an incoming communication medium to receive messages from the first pipeline component, an outgoing communication medium to send messages to the second pipeline component, a message pump to pump messages from the incoming communication medium to the outgoing communication medium.

10. The computer storage device of claim 9, wherein the method further includes:

an act instantiating the message processing pipeline for the application that deploys the first pipeline component at the first computer system, deploys the second pipeline component at the second computer system, and utilizes intra-pipeline communication link to transfer messages from the first pipeline component to the second pipeline component.

11. The computer storage device of claim 10, wherein the computer storage device comprises the one or more processors.

12. A computer system, the computer system comprising:
one or more processors;
system memory;
one or more computer storage media having stored thereon computer-executable instructions which, when executed by the one or more processors, implement a method comprising for processing pipeline specifications, the method comprising:

an act of the computer system accessing a first pipeline specification for the application that specifies at least a first pipeline component to be included in a message processing pipeline which is dependent on a first code library at a first computer system, the first pipeline specification specifying how to construct the message processing pipeline for the application;

an act of the computer system accessing a second pipeline specification for the application that specifies at least a second pipeline component to be included in the message processing pipeline which is dependent on a second code library at a second computer system;

an act of accessing additional message processing requirements for the application;

an act of identifying transforms that can be applied to the first pipeline specification to specify additional message processing functionality that satisfies the additional message processing requirements;

an act of applying the identified transforms to the first pipeline specification to create a transformed pipeline specification for the application, the transformed pipeline specification specifying how to construct a message processing pipeline for the application that satisfies the additional message processing requirements, by specifying at least one intra-pipeline communication link having an arrangement of message processing components that satisfy the additional message processing requirements;

an act of determining that the first library is available at the first computer system; and an act of determining that the second library is available at the second computer system that is different than the first computer system.

13. The system of claim 12, wherein the intra-pipeline communication link temporally decouples the other pipeline components included in the message processing pipeline.

14. The system of claim 12, wherein the intra-pipeline communication link branches between or joins together the other pipeline components included in the message processing pipeline.

15. The system of claim 12, wherein the intra-pipeline communication link alters a message or message protocols by applying message transformations or protocol bridges between the other pipeline components included in the message processing pipeline.

16. The system of claim 12, wherein the intra-pipeline communication link physically decouples the other pipeline components included in the message processing pipeline.

17. The computer system of claim 12, wherein the method further comprises:

an act of identifying components that are available to the computer system for inclusion in the message processing pipeline; and wherein the act of identifying transforms that can be applied to the first pipeline specification comprises an act of identifying transforms that can be applied to the message processing pipeline based on the identified available components.

18. The computer system of claim 12, wherein the method further includes:

an act of transforming the first specification to include an intra-pipeline communication link for connecting the first pipeline component to the second pipeline component, the intra-pipeline communication link including an incoming communication medium to receive messages from the first pipeline component, an outgoing communication medium to send messages to the second pipeline component, a message pump to pump messages from the incoming communication medium to the outgoing communication medium.

19. The computer system of claim 18, wherein the method further includes:

an act instantiating the message processing pipeline for the application that deploys the first pipeline component at the first computer system, deploys the second pipeline component at the second computer system, and utilizes intra-pipeline communication link to transfer messages from the first pipeline component to the second pipeline component.

* * * * *